(12) United States Patent
Chai et al.

(10) Patent No.: US 12,298,548 B2
(45) Date of Patent: May 13, 2025

(54) ELECTRONIC DEVICE AND METHOD OF MANUFACTURING THE SAME

(71) Applicant: Samsung Display Co., Ltd., Yongin-si (KR)

(72) Inventors: Youngki Chai, Hwaseong-si (KR); Seonggeun Won, Hwaseong-si (KR); Kwanhee Lee, Suwon-si (KR); Youngji Kim, Hwaseong-si (KR); Yiseul Um, Hongseong-gun (KR); Younghoon Lee, Gwangmyeong-si (KR); Young Seo Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/213,224

(22) Filed: Jun. 22, 2023

(65) Prior Publication Data

US 2023/0333299 A1    Oct. 19, 2023

Related U.S. Application Data

(63) Continuation of application No. 17/157,157, filed on Jan. 25, 2021, now Pat. No. 11,719,872.

(30) Foreign Application Priority Data

Apr. 7, 2020   (KR) .................. 10-2020-0041972

(51) Int. Cl.
 *G02B 5/30*   (2006.01)
 *G02B 5/00*   (2006.01)
 *H04M 1/02*   (2006.01)

(52) U.S. Cl.
 CPC ........... *G02B 5/3083* (2013.01); *G02B 5/003* (2013.01); *H04M 1/0264* (2013.01); *H04M 1/0266* (2013.01)

(58) Field of Classification Search
 CPC ...... G02B 5/003; G02B 5/3083; G02B 5/223; H04M 1/0266; H04M 1/0264
 See application file for complete search history.

(56) References Cited

U.S. PATENT DOCUMENTS 8,467,177 B2   6/2013   Mathew et al.
8,628,637 B2   1/2014   Ishii et al.
(Continued)

FOREIGN PATENT DOCUMENTS

CN   102129134      7/2011
CN   102129134 A  * 7/2011   ....... G02F 1/133308
(Continued)

OTHER PUBLICATIONS

Non-Final Office Action mailed Sep. 30, 2022, in U.S. Appl. No. 17/157,157.
(Continued)

*Primary Examiner* — Hoan C Nguyen
(74) *Attorney, Agent, or Firm* — CANTOR COLBURN LLP

(57) ABSTRACT

An electronic device includes a display panel that has a first area and a second area; a polarizer including a polarizer layer that has a polarization area and a transmission area, a protection layer disposed under the polarizer layer, and a plurality of retarders disposed under the protection layer for retarding a phase of light incident thereon.

9 Claims, 11 Drawing Sheets

(56) References Cited

U.S. PATENT DOCUMENTS

| | | |
|---|---|---|
| 10,081,141 B2 | 9/2018 | Lee et al. |
| 10,101,511 B2 | 10/2018 | Goto et al. |
| 10,288,788 B2 | 5/2019 | Chen et al. |
| 10,359,553 B2 | 7/2019 | Lee et al. |
| 10,754,072 B2 | 8/2020 | Yaegashi et al. |
| 11,243,645 B2 | 2/2022 | Kim et al. |
| 2007/0222912 A1 | 9/2007 | Sato et al. |
| 2015/0131035 A1* | 5/2015 | Chen ............... G02F 1/133533 427/163.1 |
| 2016/0299272 A1* | 10/2016 | Lee ....................... B23K 26/38 |
| 2017/0358163 A1 | 12/2017 | Clara et al. |
| 2019/0018143 A1 | 1/2019 | Thayer et al. |
| 2020/0004083 A1 | 1/2020 | Byun et al. |

FOREIGN PATENT DOCUMENTS

| | | | |
|---|---|---|---|
| CN | 106662689 | | 5/2017 |
| JP | 2015075746 | | 4/2015 |
| JP | 2015075746 | A * | 4/2015 |
| JP | 2017194568 | A * | 10/2017 |
| JP | 6604714 | | 11/2019 |
| KR | 10-2010-0125537 | | 12/2010 |
| KR | 20120046035 | | 5/2012 |
| KR | 10-2016-0130360 | | 11/2016 |
| KR | 10-2017-0055014 | | 5/2017 |
| KR | 10-1828712 | | 2/2018 |
| KR | 20180081197 | A | 7/2018 |
| KR | 10-1953171 | | 2/2019 |
| KR | 20200019305 | A | 2/2020 |
| WO | 2019227835 | | 12/2019 |
| WO | 2020091065 | | 5/2020 |

OTHER PUBLICATIONS

Final Office Action mailed Jan. 11, 2023, in U.S. Appl. No. 17/157,157.

Notice of Allowance issued Mar. 21, 2023, in U.S. Appl. No. 17/157,157.

* cited by examiner

ELECTRONIC DEVICE AND METHOD OF MANUFACTURING THE SAME

CROSS REFERENCE TO RELATED APPLICATION

This application is a Continuation of U.S. patent application Ser. No. 17/157,157, filed Jan. 25, 2021, which claims priority from and the benefit of Korean Patent Application No. 10-2020-0041972, filed on Apr. 7, 2020, each of which is hereby incorporated by reference for all purposes as if fully set forth herein.

BACKGROUND

Field

The present disclosure relates to an electronic device and a method of manufacturing the same and, more particularly, to an electronic device having a polarizing plate from which polarization is partially eliminated and a method of manufacturing the electronic device.

Discussion of the Background

In recent years, various portable electronic devices are coming into wide use, and their functions are being diversified. Users prefer electronic devices with a larger display area and a smaller bezel area. To this end, various types of electronic devices are being developed, and for example, an electronic device in which a camera and a sensor overlap the display area is being developed.

The above information disclosed in this Background section is only for understanding of the background of the inventive concepts, and, therefore, it may contain information that does not constitute prior art.

SUMMARY

Applicant realized that there is a need to partially increase the transmittance of a polarizing plate of a display device in order to allow the camera to overlap the display area.

Electronic devices constructed according to principles and exemplary implementations of the invention have improved light transmittance in a portion of the display area overlapping an electronic module, such as a camera or sensor. For example, the light transmittance may be improved by removing polarization from a portion of a polarizing plate. Methods of manufacturing the electronic device in accordance with the principles and exemplary embodiments of the invention can provide improved light transmittance in portion of the display area overlapping an electronic module.

According to the principles and some exemplary embodiments of the invention, the residual light-absorbing material on the polarizer layer can be removed by irradiating a laser beam onto the polarizer layer and using a neutral solution, which avoids the color change phenomenon that would otherwise occur in the polarizer layer, thereby improving the light transmittance. In addition, the light transmittance of the display area of the electronic device can increase without physically removing a portion of the polarizer layer overlapping the electronic module.

Additional features of the inventive concepts will be set forth in the description which follows, and in part will be apparent from the description, or may be learned by practice of the inventive concepts.

According to one aspect of the invention, a method of manufacturing an electronic device includes the steps of: providing a display panel; providing a polarizer including a polarizer layer at an outermost layer thereof on the display panel; irradiating a laser beam onto a portion of the polarizer layer; and providing a substantially neutral solution having a temperature from about 5° C. to about 40° C. onto the portion of the polarizer layer irradiated with the laser beam.

The laser beam may have a wavelength substantially equal to or greater than about 340 nm and substantially equal to or smaller than about 810 nm.

The laser beam may have a continuous wave laser beam.

The laser beam may have a pulse laser beam having a pulse width of a nanosecond or longer.

The method of claim 1, wherein the laser beam has an output substantially equal to or greater than about 0.5 W and equal to or smaller than about 10 W.

The neutral solution may include a water.

The polarizer layer may include an elongated film and a light-absorbing material adsorbed to the elongated film, the step of irradiating of the laser beam may include detaching the light-absorbing material, and the step of providing of the neutral solution may include extracting the detached light-absorbing material.

The light-absorbing material may include at least one of iodine and dichroic dye.

The display panel may include a first area defining a hole; and a second area surrounding at least a portion of the first area, with the portion of the polarizer layer irradiated with the laser beam overlapping the first area.

The step of irradiating the laser beam onto the portion of the polarizer layer may include patterning the portion of the polarizer layer to create a plurality of non-polarization portions and a polarization portion at least partially surrounding the non-polarization portions.

The non-polarization portions may be made by laser beams emitted from a plurality of light sources.

The polarizer may include a polarizing plate that includes: the polarizer layer and a protective layer disposed under the polarizer layer; and a retarder disposed under the protective layer.

According to another aspect of the invention, an electronic device includes: an electronic module; a display panel including a first area overlapping the electronic module and a second area at least partially surrounding at least a portion of the first area; and a polarizer disposed on the display panel and including a polarizer layer, wherein the polarizer layer has a polarization area and a transmission area overlapping the first area with at least a portion of the transmission area including a non-polarization portion.

The non-polarization portion may have a light transmittance substantially equal to or greater than about 80%.

The polarizer layer may include an elongated film member; and a light-absorbing material adsorbed to the film member, and the non-polarization portion of the transmission area is a portion wherein the light-absorbing material is detached from the film member.

The light-absorbing material may include at least one of iodine and dichroic dye.

The transmission area may include: a plurality of non-polarization portions; and a polarization portion at least partially surrounding the non-polarization portions.

The display panel may include a pixel layer having a plurality of light emitting areas and a non-light-emitting area at least partially surrounding the plurality of light emitting areas, and the non-polarization portions to overlap at least a portion of the non-light-emitting area.

The electronic module may include a camera module.

A window may be disposed on the polarizer; and an adhesive layer may be disposed between the polarizer and the window.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
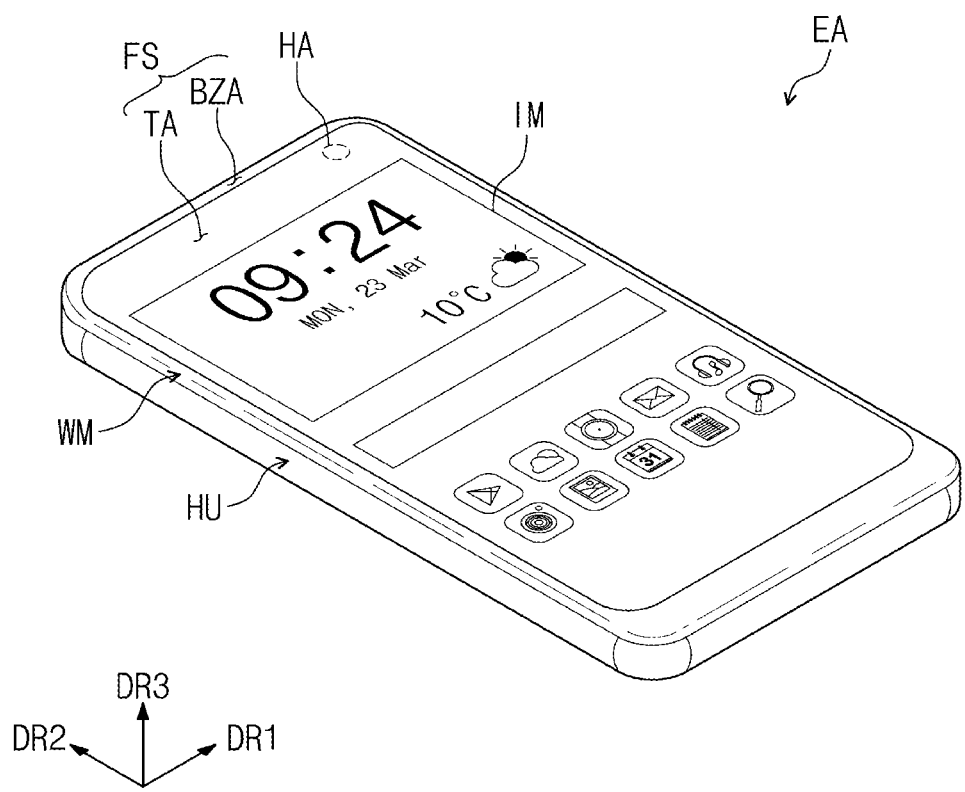
FIG. 1 is a perspective view of an exemplary embodiment of an electronic device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, sections, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
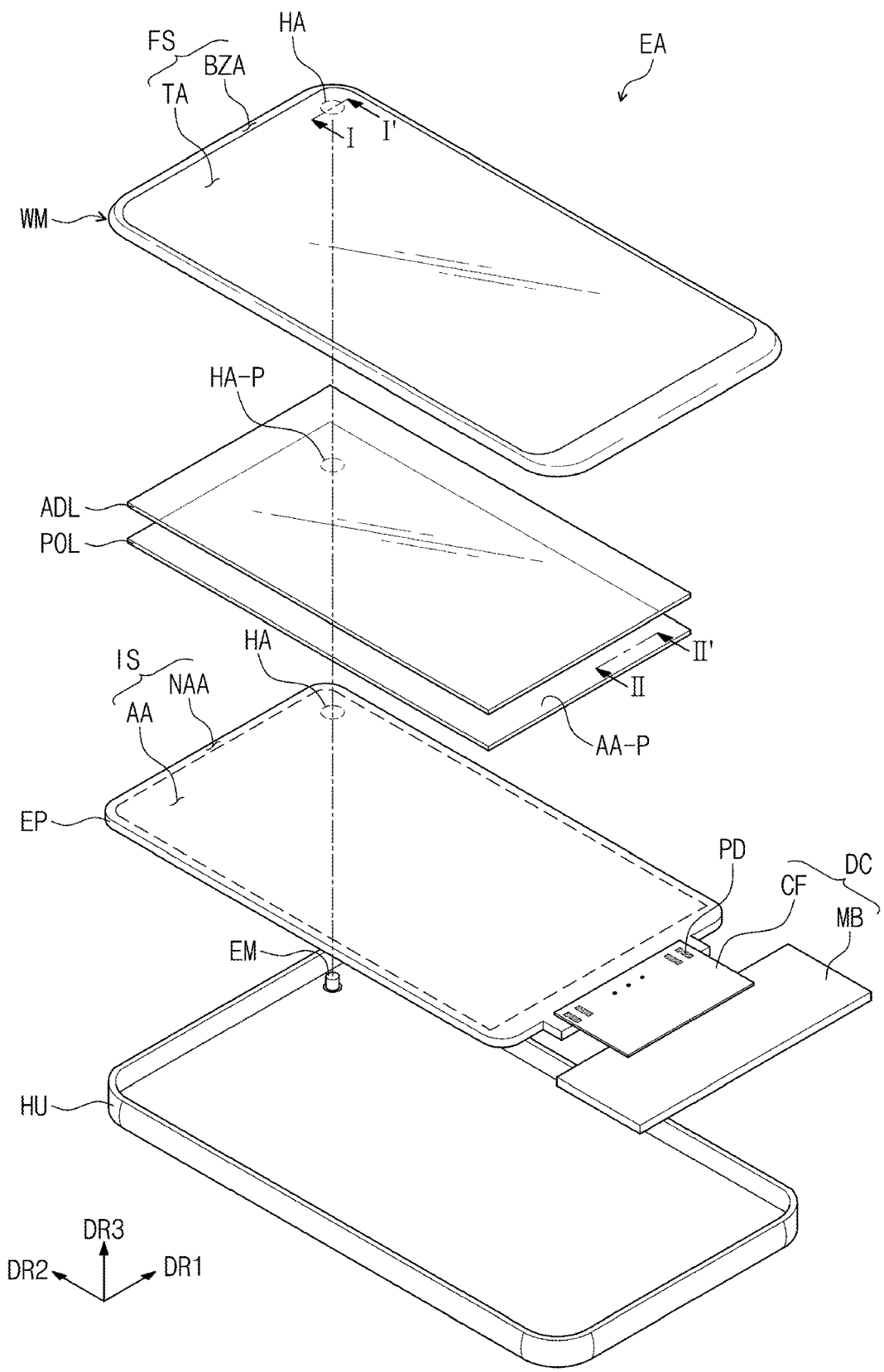
FIG. 2 is an exploded perspective view of the electronic device of FIG. 1.
Figure 3:
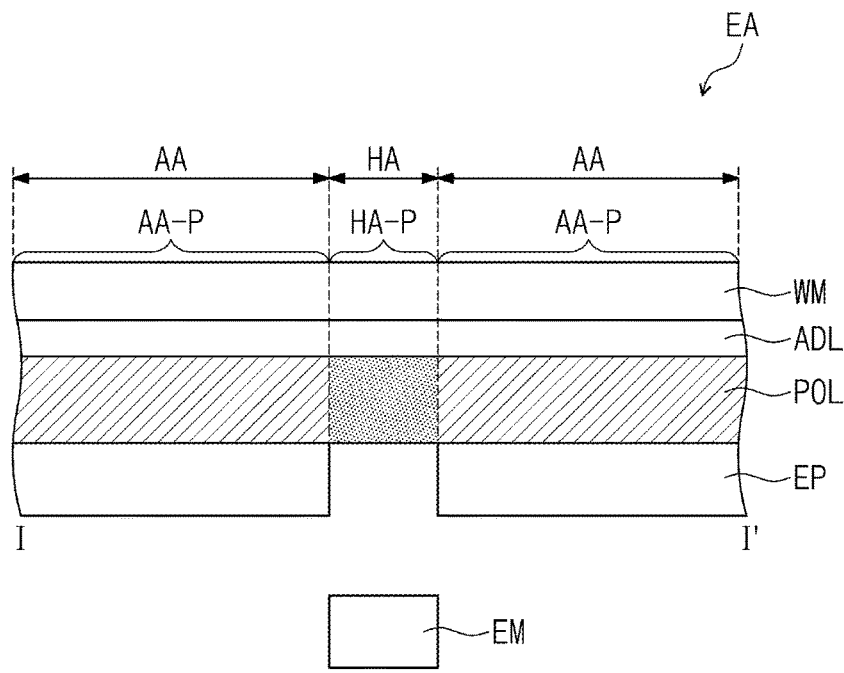
FIG. 3 is a cross-sectional view illustrating a portion of the electronic device EA, which is taken along line I-I' of FIG. 2.
Figure 3:
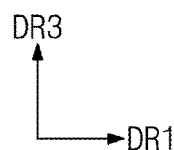

FIG. 1 is a perspective view of an exemplary embodiment of an electronic device constructed according to the principles of the invention. FIG. 2 is an exploded perspective view of the electronic device of FIG. 1. FIG. 3 is a cross-sectional view illustrating a portion of the electronic device EA, which is taken along line I-I' of FIG. 2. Hereinafter, the electronic device EA according to the exemplary embodiments will be described with reference to FIGS. 1 to 3.

The electronic device EA may be a device that is activated in response to an electrical signal. For example, the electronic device EA may be applied to or take the form of a computer, a notebook computer, a tablet computer, a television set, or the like. The electronic device EA may be applied to other electronic items as long as they do not depart from the principles of the invention. In some exemplary embodiments, a smartphone will be described as a representative example of the electronic device EA.

The electronic device EA may be flexible, namely, that the electronic device EA has a flexible property, and the electronic device EA may be fully bent or may be bent in the scale of a few nanometers. For example, the electronic device EA may be, but not limited to, a generally curved electronic device or a generally foldable electronic device. In addition, the electronic device EA may be substantially rigid.

Referring to FIG. 1, a window WM may include a front surface FS exposed to the outside. A front surface FS of the electronic device EA may be defined by the front surface FS of the window WM. The electronic device EA may display an image IM through the front surface FS. The front surface FS may be defined by a surface substantially parallel to a surface defined by a first directional axis DR1 and a second directional axis DR2. The front surface FS includes a display area TA and a bezel area BZA defined adjacent to the display area TA.

In the illustrated embodiment, front (or upper) and rear (or lower) surfaces of each member are defined with respect to a direction in which the image IM is displayed. The front and rear surfaces are opposite to each other in a third directional axis DR3.

Directions indicated by the first, second, and third directional axes DR1, DR2, and DR3 may be relative to each other and may be changed to other directions. Hereinafter, first, second, and third directions respectively correspond to directions indicated by the first, second, and third directional axes DR1, DR2, and DR3 and are assigned with the same reference numerals as those of the first, second, and third directional axes DR1, DR2, and DR3.

The image IM may be displayed through the display area TA of the electronic device EA. The image IM may include at least one of a still image and a motion image. FIG. 1 shows a clock widget and application icons as a representative example of the image IM.

The display area TA may have a generally quadrangular shape substantially parallel to the first directional axis DR1 and the second directional axis DR2. However, this is merely exemplary, and the display area TA may have a variety of shapes, and it should not be limited thereto or thereby.

The bezel area BZA may be defined adjacent to the display area TA. As shown in FIG. 1, the bezel area BZA may surround the display area TA. However, this is merely exemplary, and bezel area BZA may be defined adjacent to only one side of the display area TA or may be omitted.

Referring to FIGS. 1 to 3, the electronic device EA may include a first area HA. The first area HA (hereinafter, referred to as "hole area" or "first area") may be an area through which a hole is defined. The image IM provided from the electronic device EA may be displayed surrounding at least a portion of an edge of the first area HA. As another exemplary embodiment, the image IM provided from the electronic device EA may be displayed through the entire portion of the display area TA including the first area HA. That is, the image IM may also be displayed through the first area HA.

The window WM may be disposed on a display panel EP and may cover a front surface IS of the display panel EP. The window WM may include an optically transparent insulating material. For example, the window WM may be a glass or plastic material. The window WM may have a single-layer or multi-layer structure.

The display panel EP may include the first area HA and a second area AA surrounding at least a portion of the first area HA. The second area AA (hereinafter, referred to as "active area" or "second area") may be defined as an active area, and the first area HA may be defined as the hole area.

The first area HA may be defined to have a variety of shapes. In some exemplary embodiments, the first area HA is shown as having a generally circular shape, however, the shape of the first area HA should not be limited to the generally circular shape. That is, the first area HA may have a variety of shapes, such as a generally oval shape, a generally quadrangular shape, or a shape including generally curved and straight sides.

At least a portion of the first area HA may be surrounded by the active area AA. In some exemplary embodiments, the edge of the first area HA may be fully surrounded by the active area AA. The first area HA may be defined at a position that overlaps the display area TA and is spaced apart from the bezel area BZA when the electronic device EA is assembled.

The display area TA may be optically transparent. The display area TA may have a shape corresponding to that of the active area AA. For example, the display area TA may overlap all or a portion of the active area AA. The image IM displayed through the active area AA of the display panel EP may be viewed from the outside through the display area TA.

A peripheral area NAA may be defined adjacent to the active area AA. The peripheral area NAA may surround the active area AA. A driving circuit or a driving line required to drive the active area AA may be arranged in the peripheral area NAA.

The peripheral area NAA may be covered by the bezel area BZA, and thus, the peripheral area NAA covered by the bezel area BZA may be prevented from being viewed from the outside. This is merely exemplary, and the bezel area BZA may be omitted.

A polarizer in the form of a polarizing plate POL may be disposed between the window WM and the display panel EP. The polarizing plate POL may reduce reflectance of external light incident thereto from the outside of the window WM. Accordingly, external light visibility may be improved. In some exemplary embodiments, the polarizing plate POL may include a polarizing film.

In some exemplary embodiments, the polarizing plate POL may include a transmission area HA-P and a polarizing area AA-P. The transmission area HA-P may overlap the hole area HA of the display panel EP. At least a portion of the transmission area HA-P may be at least partially surrounded by the polarizing area AA-P. The transmission area HA-P may overlap an electronic module EM and may have a light transmittance higher than that of the polarizing area AA-P of the polarizing plate POL.

An adhesive layer ADL may be disposed between the polarizing plate POL and the window WM and may combine the polarizing plate POL and the window WM. The adhesive layer ADL may include an optically clear resin.

The electronic module EM may be disposed under the window WM. The electronic module EM may overlap the first area HA of the display panel EP in a plan view. As the electronic module EM overlaps the first area HA, the size of bezel area BZA may not increase.

The electronic module EM may overlap the transmission area HA-P of the polarizing plate POL, which overlaps the first area HA. The electronic module EM may receive an external input applied thereto through the transmission area HA-P or may provide an output through the transmission area HA-P. The transmission area HA-P may be an area which overlaps a camera module that photographs an external object or an area which overlaps a light sensor that senses light. In an exemplary embodiment, the electronic module EM may be the camera module with lens facing the front surface FS.

In the exemplary embodiment shown in FIG. 2, the display panel EP is assembled in a generally flat position such that the active area AA and the peripheral area NAA face the window WM. However, this is merely exemplary, and a portion of the display panel EP may be bent in the peripheral area NAA. In this case, the portion of the peripheral area NAA may face a rear surface of the electronic device EA, so that the bezel area BZA on the front surface of the electronic device EA may be reduced. In addition, the display panel EP may be assembled in a position where a portion of the active area AA is bent. Further, the peripheral area NAA of the display panel EP may be omitted according to another exemplary embodiment.

The electronic device EA may include a circuit board DC connected to the display panel EP. The circuit board DC may include a flexible board CF and a main board MB. The flexible board CF may include an insulating film and conductive lines mounted on the insulating film. The conductive lines may be connected to pads PD to electrically connect the circuit board DC to the display panel EP. Various signal lines, the pads PD, or electronic elements may be arranged in the peripheral area NAA to provide electrical signals to the active area AA.

In an exemplary embodiment, the flexible board CF may be assembled in a bent position. Accordingly, the main board MB may be disposed on a rear surface of the display panel EP and may be stably accommodated in a space provided by a housing HU. In an exemplary embodiment, the flexible board CF may be omitted, and in this case, the main board MB may be connected directly to the display panel EP.

The main board MB may include signal lines and electronic elements. The electronic elements may be connected to the signal lines to be electrically connected to the display panel EP. The electronic elements may generate a variety of electrical signals, such as a signal to generate the image IM or a signal to sense the external input, or may process the sensed signal. The main board MB may be provided in plural, and the main boards MB may respectively correspond to the electrical signals to be generated and processed, however, they should not be particularly limited.

Figure 4:
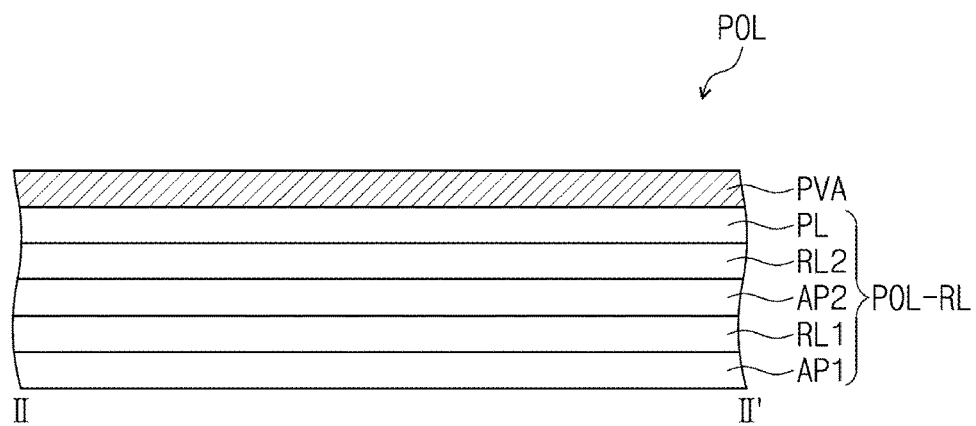
FIG. 4 is a cross-sectional view illustrating an exemplary embodiment of a portion of a polarizing plate, which is taken along line II-II' of FIG. 2.
Figure 4:
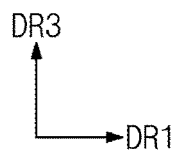

FIG. 4 is a cross-sectional view illustrating an exemplary embodiment of a portion of a polarizing plate, which is taken along line II-II' of FIG. 2. The polarizing plate POL according to some exemplary embodiments may include a polarizer layer PVA and a retarder member POL-RL disposed under the polarizer layer PVA. The retarder member POL-RL may include a protective layer PL, and at least one retarder RL1 and RL2. FIG. 4 depicts a polarizing plate POL that includes a plurality of retarders RL1 and RL2.

The polarizer layer PVA may be an optical layer that polarizes a light provided thereto to one direction. The polarizer layer PVA may include a film member that is elongated and oriented in a certain direction. The film member may be a polymer film. For example, the elongated polymer film may be an elongated polyvinyl alcohol-based film, however, it should not be limited thereto or thereby.

The polarizer layer PVA may be manufactured by adsorbing a light-absorbing material onto the elongated film member. The light-absorbing material may be a dichroic dye or iodine. For example, the polarizer layer PVA may include the polyvinyl alcohol-based film adsorbed with iodine. The polarizer layer PVA including the light-absorbing material may absorb a light vibrating in the elongated direction and may transmit a light vibrating in a vertical direction therethrough to obtain a polarization axis with a specific vibration direction.

The polarizing plate POL may include the first retarder RL1 and the second retarder RL2, which are disposed under the polarizer layer PVA. The polarizing plate POL may include one retarder. The first retarder RL1 may be disposed under the second retarder RL2. Each of the first retarder RL1 and the second retarder RL2 may be an optical layer that retards a phase of the light provided thereto. The first retarder RL1 may be a $\lambda/4$ retarder, and the second retarder RL2 may be a $\lambda/2$ retarder.

Each of the first retarder RL1 and the second retarder RL2 may be a liquid crystal coating layer. The first retarder RL1 and the second retarder RL2 may be the liquid crystal coating layer formed using a reactive liquid crystal monomer. The first retarder RL1 and the second retarder RL2 may be manufactured by coating, aligning, and polymerizing the reactive liquid crystal monomer.

The protective layer PL may be disposed between the second retarder RL2 and the polarizer layer PVA. The protective layer PL may include a protective film, and the protective film may be a tri-acetyl cellulose (TAC) film, however, it should not be limited thereto or thereby.

The polarizing plate POL may include at least one adhesive layers AP1 and AP2. As shown in FIG. 4, a first adhesive layer AP1 may be disposed under a first retarder RL1, and a second adhesive layer AP2 may be disposed under a second retarder RL2. The first adhesive layer AP1 may attach components disposed under the polarizing plate POL to the polarizing plate POL. For example, the first adhesive layer AP1 may attach an upper portion of the display panel EP to the polarizing plate POL. The second adhesive layer AP2 may attach the retarders RL1 and RL2 to each other.

Referring to FIG. 3, the polarizing plate POL may include the transmission area HA-P. The transmission area HA-P may be formed by an exemplary method of manufacturing the electronic device shown in FIG. 5. The transmission area HA-P may include a non-polarization portion NPVA (as depicted in FIG. 6B) from which the light-absorbing material adsorbed to the film member of the polarizer layer PVA is detached. Due to the detachment of the light-absorbing material, polarization of the non-polarization portion NPVA is eliminated, and the light transmittance of the non-polarization portion NPVA increases. Thus, the light sensitivity of the electronic module EM that is disposed under the polarizing plate POL and overlaps the transmission area HA-P may increase.

Figure 5:
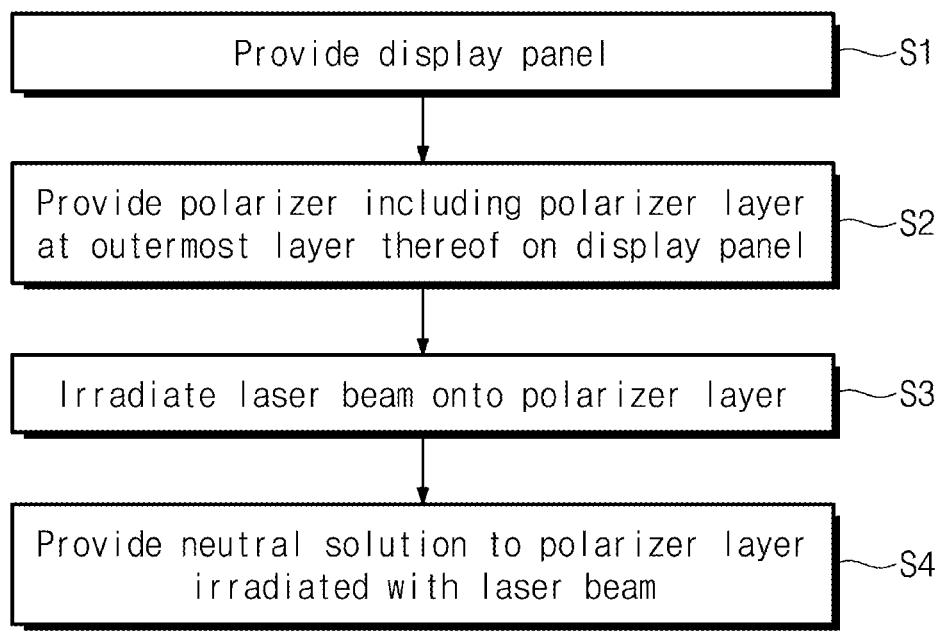
FIG. 5 is a flowchart showing an exemplary embodiment of a method of manufacturing an electronic device according to the principles of the invention.
Figure 6A:
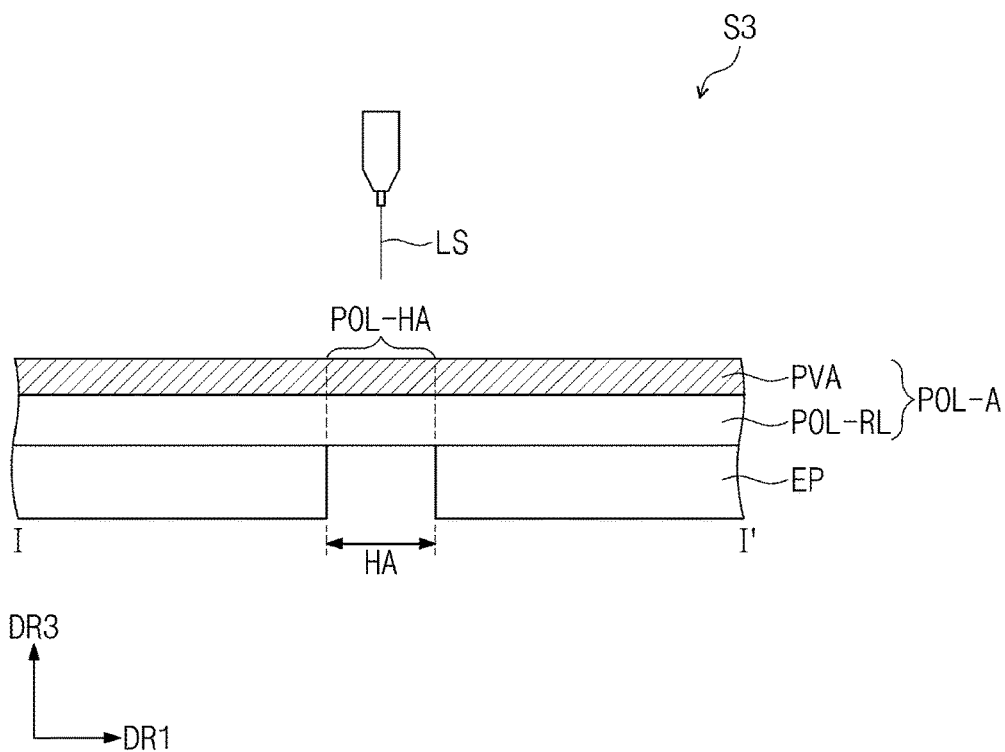
FIG. 6A is a cross-sectional view taken along line I-I' of FIG. 2 illustrating an exemplary embodiment of an operation of the method of manufacturing the electronic device
Figure 6B:
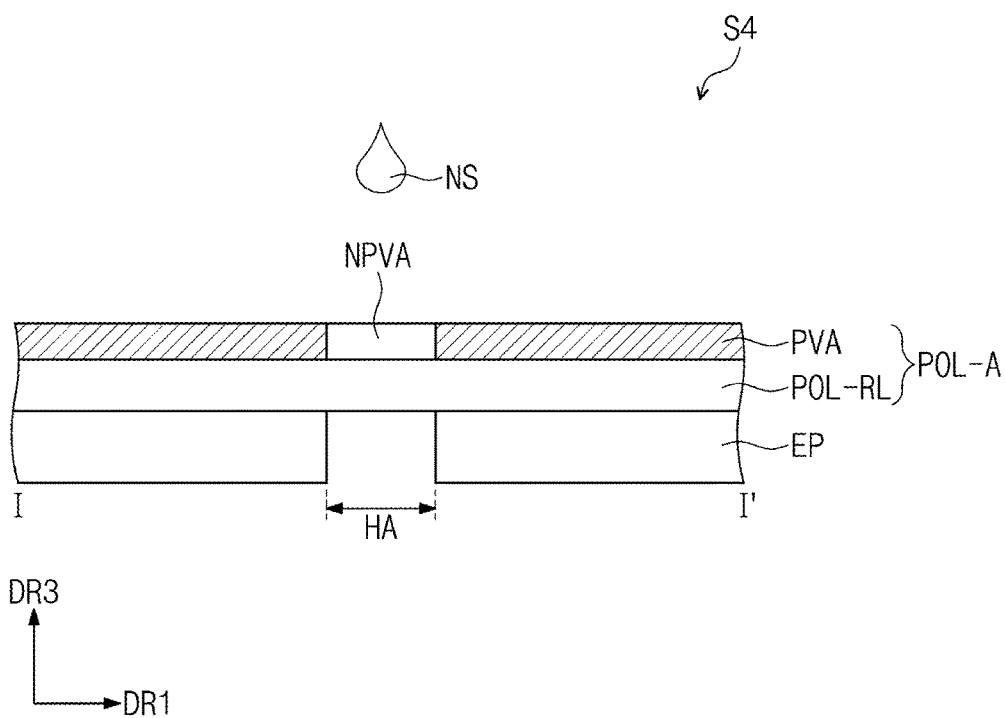
FIG. 6B is a cross-sectional view taken along line I-I' of FIG. 2 illustrating another exemplary embodiment of an operation of the method of manufacturing the electronic device.
Figure 7:
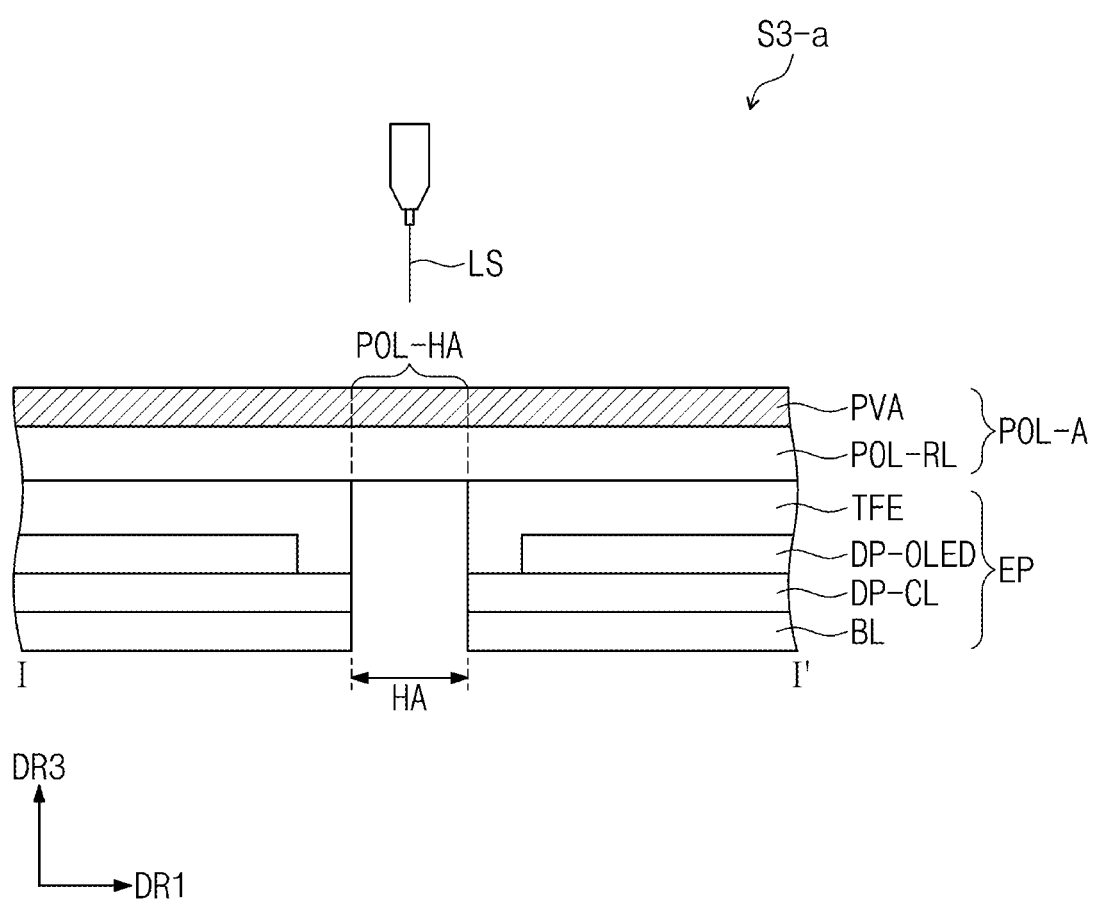
FIG. 7 is a cross-sectional view taken along line I-I' of FIG. 2 illustrating a further exemplary embodiment of an operation of the method of manufacturing the electronic device.
Figure 8:
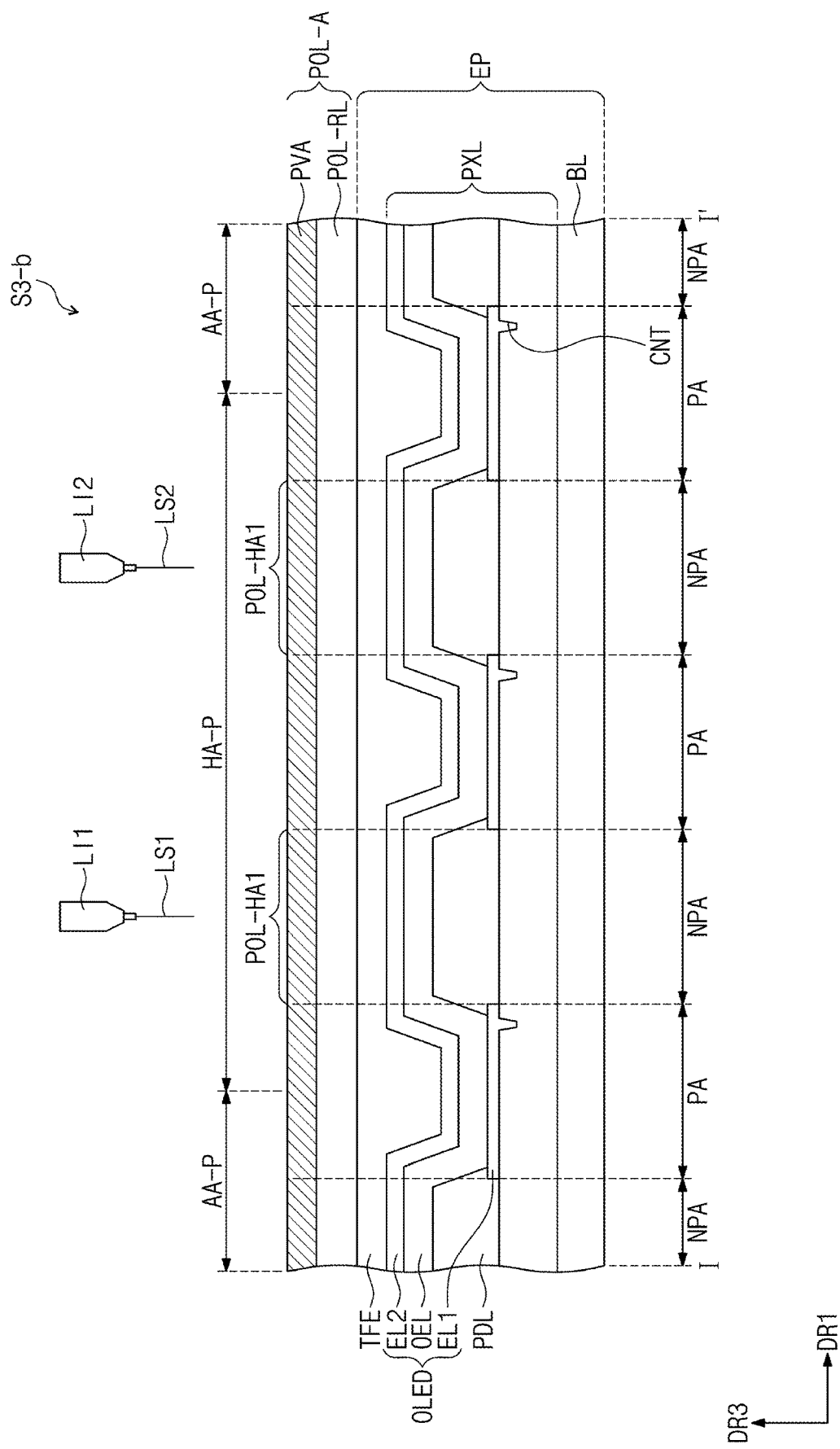
FIG. 8 is a cross-sectional view taken along line I-I' of FIG. 2 illustrating yet another exemplary embodiment of an operation of the method of manufacturing the electronic device.

FIG. 5 is a flowchart showing an exemplary embodiment of a method of manufacturing an electronic device according to the principles of the invention. FIG. 6A is a cross-sectional view taken along line I-I' of FIG. 2 illustrating an exemplary embodiment of an operation of the method of manufacturing the electronic device. FIG. 6B is a cross-sectional view taken along line I-I' of FIG. 2 illustrating another exemplary embodiment of an operation of the method of manufacturing the electronic device. FIG. 7 is a cross-sectional view taken along line I-I' of FIG. 2 illustrating a further exemplary embodiment of an operation of the method of manufacturing the electronic device. FIG. 8 is a cross-sectional view taken along line I-I' of FIG. 2 illustrating yet another exemplary embodiment of an operation of the method of manufacturing the electronic device.

The manufacturing method of the electronic device according to some exemplary embodiments may include providing the display panel (S1), providing the polarizer, which includes the polarizer layer disposed at an outermost layer thereof, on the display panel (S2), irradiating a laser beam onto the polarizer layer (S3), and providing a neutral solution having a temperature from about 5° C. to about 40° C. to the polarizer layer irradiated with the laser beam (S4).

The display panel EP provided in the operation (S1) of providing the display panel may include the first area HA and the second area AA surrounding at least the portion of the first area HA. As an example, the display panel EP in which the first area HA is defined as the hole area may be provided. Details on the display panel EP described above may be equally applied to the display panel EP including the hole area HA. As another example, the display panel EP may be a display panel EP that includes a pixel layer PXL in the first area HA overlapping the electronic module EM to allow the image IM to be displayed through the first area HA.

In the step of providing the polarizer on the display panel(S2), the polarizer may be provided in the form of a polarizing plate POL-A. The polarizing plate POL-A provided in the operation (S2) of providing the polarizing plate POL-A on the display panel (S2) may include the polarizer layer PVA disposed at the outermost layer thereof, as described with reference to FIG. 4. As the polarizer layer PVA is disposed at the outermost layer of the polarizing plate POL, the neutral solution NS used to extract the light-absorbing material that is detached after the laser beam LS is irradiated may be provided to the polarizer layer PVA.

FIG. 6A is a cross-sectional view showing the irradiating of the laser beam LS to the polarizer layer PVA of the polarizing plate POL-A. The laser beam LS may be irradiated to an area POL-HA of the polarizer layer PVA, which overlaps the first area HA in which the hole is defined. The laser beam LS may detach the light-absorbing material included in the polarizer layer PVA. For example, the iodine adsorbed to the elongated film member may be detached.

The laser beam LS may be light selected from a wavelength range from about 340 nm or more and about 810 nm or less. The light corresponding to the wavelength range may be absorbed by the light-absorbing material adsorbed to the film member, and thus, an electron excitation may occur. For example, the electron excitation may occur in the iodine adsorbed to the film member by the laser beam LS irradiated to the iodine, and thus, the iodine may dissociate into a monomolecular iodine. As a result, the polarization of the area POL-HA to which the laser beam LS is irradiated may be eliminated, and the light transmittance of the area POL-HA may increase.

The laser beam LS may be a continuous wave laser beam. As another way, the laser beam LS may be a pulse laser beam and may have a pulse width of nanoseconds or more. The laser beam LS may decolorize the polarizer layer PVA by detaching the dichroic dye or iodine adsorbed to the polarizer layer PVA without physically removing a polarizing plate POL-A.

The laser beam LS may have an output value in a range equal to or greater than about 0.5 W and equal to or smaller than about 10 W. The laser beam LS having the output value smaller than about 0.5 W may not be sufficient to cause the detachment of the light-absorbing material. The laser beam LS having the output value exceeding about 10W may cause a damage on the polarizer layer PVA due to the energy of the laser beam LS, and as a result, defects may occur in a surface of the polarizer layer PVA.

FIG. 6B is a cross-sectional view showing the providing of the neutral solution NS to the polarizer layer PVA of the polarizing plate POL-A onto which the laser beam LS is irradiated (S4). The neutral solution NS may dissolve and extract the light-absorbing material detached from the polarizer layer PVA onto which the laser beam LS is irradiated, e.g., the dichroic dye or iodine. As the residual dichroic dye or the iodine is extracted by the neutral solution NS, a color change due to a reversible reaction of the residual light-absorbing material does not occur in the non-polarization portion NPVA, and the light transmittance of the non-polarization portion NPVA may increase.

The neutral solution NS may have a temperature value in a range equal to or greater than about 5° C. and equal to or smaller than about 40° C. The neutral solution NS having the temperature value below about 5° C. may have a poor solubility and may not be sufficient to dissolve the residual light-absorbing material. For example, a process time increases to sufficiently dissolve the residual dichroic dye or iodine in the neutral solution NS having the temperature value below about 5° C. The neutral solution NS having the temperature value exceeding about 40° C. lowers the polarization degree of a polarization area AA-P included in the polarizing plate POL-A in the operation of providing the neutral solution NS.

The neutral solution NS may be a solution having a pH value between about pH 6 and about pH 8. For example, the neutral solution NS may have the pH value of about pH 7. The neutral solution NS may be a water, such as distilled, purified, mineral, or tap water, however, it should not be limited thereto or thereby.

FIGS. 7 and 8 are cross-sectional views taken along a line I-I' of FIG. 2 to show operations (S3-*a* and S3-*b*) of irradiating the laser beam LS onto the polarizing plate POL-A. FIG. 7 shows an exemplary manufacturing method of an electronic device that is provided with a display panel EP provided with a hole area HA defined therein. FIG. 8 shows an exemplary manufacturing method of an electronic device that includes a polarizer layer PVA including a plurality of non-polarization portions NPVA.

Referring to FIG. 7, the display panel EP may include a base layer BL, a circuit layer DP-CL, a light emitting element layer DP-OLED, and an encapsulation layer TFE. The circuit layer DP-CL may be disposed on the base layer BL. The circuit layer DP-CL may include a plurality of transistors to drive a light emitting element of the light emitting element layer DP-OLED.

The encapsulation layer TFE may be disposed on the light emitting element layer DP-OLED and may cover the light emitting element. The encapsulation layer TFE may include at least one inorganic layer. In addition, the encapsulation layer TFE may include an organic layer disposed between inorganic layers. The encapsulation layer TFE may protect the light emitting element from moisture, oxygen, or a foreign substance.

The hole area HA defined through the display panel EP may not overlap the circuit layer DP-CL and the light emitting element layer DP-OLED of the display panel EP. The hole area HA may overlap the electronic module EM.

The laser beam LS irradiated onto the polarizing plate POL-A shown in FIG. 7 in the operation (S3-*a*) may be irradiated onto the area in which the hole area HA overlaps the polarizer layer PVA. When the operations of the irradiating of the laser beam LS and the providing of the neutral solution NS are performed on the polarizer layer PVA, the light transmittance of an area POL-HA onto which the laser beam is irradiated may increase. The area POL-HA onto which the laser beam is irradiated may overlap the electronic module EM, and thus, a sensitivity of the electronic module EM that receives the external input may increases.

Figure 10:
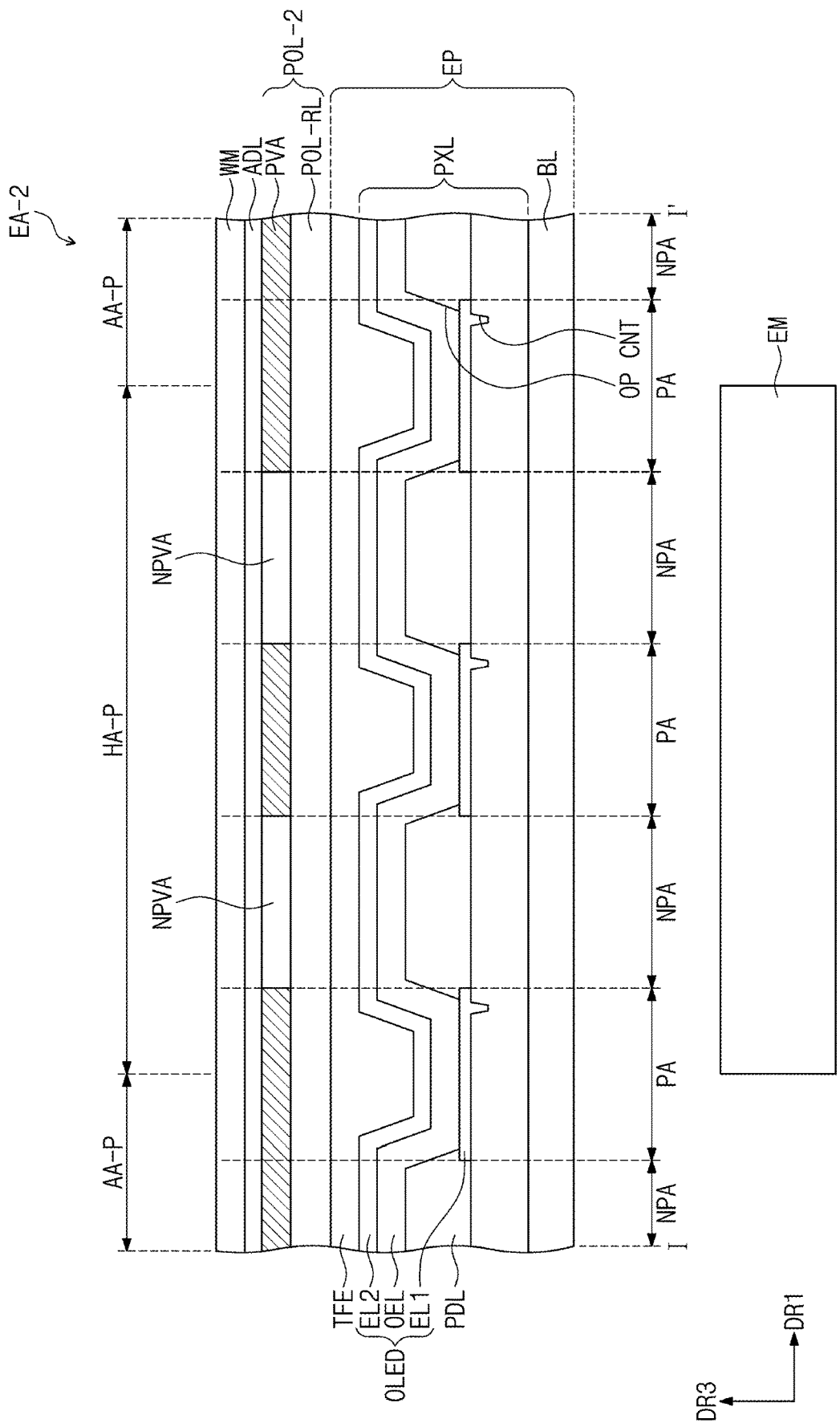
FIG. 10 is a cross-sectional view taken along line I-I' of FIG. 2 illustrating a further exemplary embodiment of an electronic device constructed according to the principles of the invention.

FIG. 8 shows an operation of irradiating laser beams LS1 and LS2 according to another exemplary embodiment. Referring to FIG. 8, a first area HA defined through a display panel EP may overlap a transmission area HA-P of a polarizer layer PVA. The laser beams LS1 and LS2 may be irradiated such that a plurality of non-polarization portions NPVA (as depicted in FIG. 10) is included in the transmission area HA-P. An area POL-HA1 onto which the laser beams LS1 and LS2 are irradiated may overlap a non-light-emitting area NPA of the display panel EP. The transmission area HA-P may include the non-polarization portions NPVA and may include a polarization portion PVA-a (as depicted in FIG. 11) disposed between the non-polarization portions NPVA.

The plural laser beams LS1 and LS2 may be irradiated by at least one light source LI1 and LI2. FIG. 8 shows an exemplary embodiment in which the laser beams LS1 and LS2 respectively emitted from the light sources LI1 and LI2 are irradiated onto a plurality of areas POL-HA1 of the polarizer layer PVA.

The non-polarization portions NPVA (as depicted in FIG. 10) may be formed by a mask method. That is, when a mask including a transmission portion and a non-transmission portion is disposed on the polarizer layer PVA and the laser beam LS is irradiated, a portion of the polarizer layer PVA onto which the laser beam LS is irradiated through the transmission portion may be formed as the non-polarization portion NPVA. For example, the mask used to form the non-polarization portion NPVA may be a fine metal mask (FMM), however, the exemplary embodiments are not be limited thereto or thereby. The polarizer layer PVA that includes the non-polarization portions NPVA may be formed by providing the laser beam LS that transmits through a plurality of transmission portions. In addition, portions in which the non-polarization portions are formed may overlap the electronic module EM.

Figure 11:
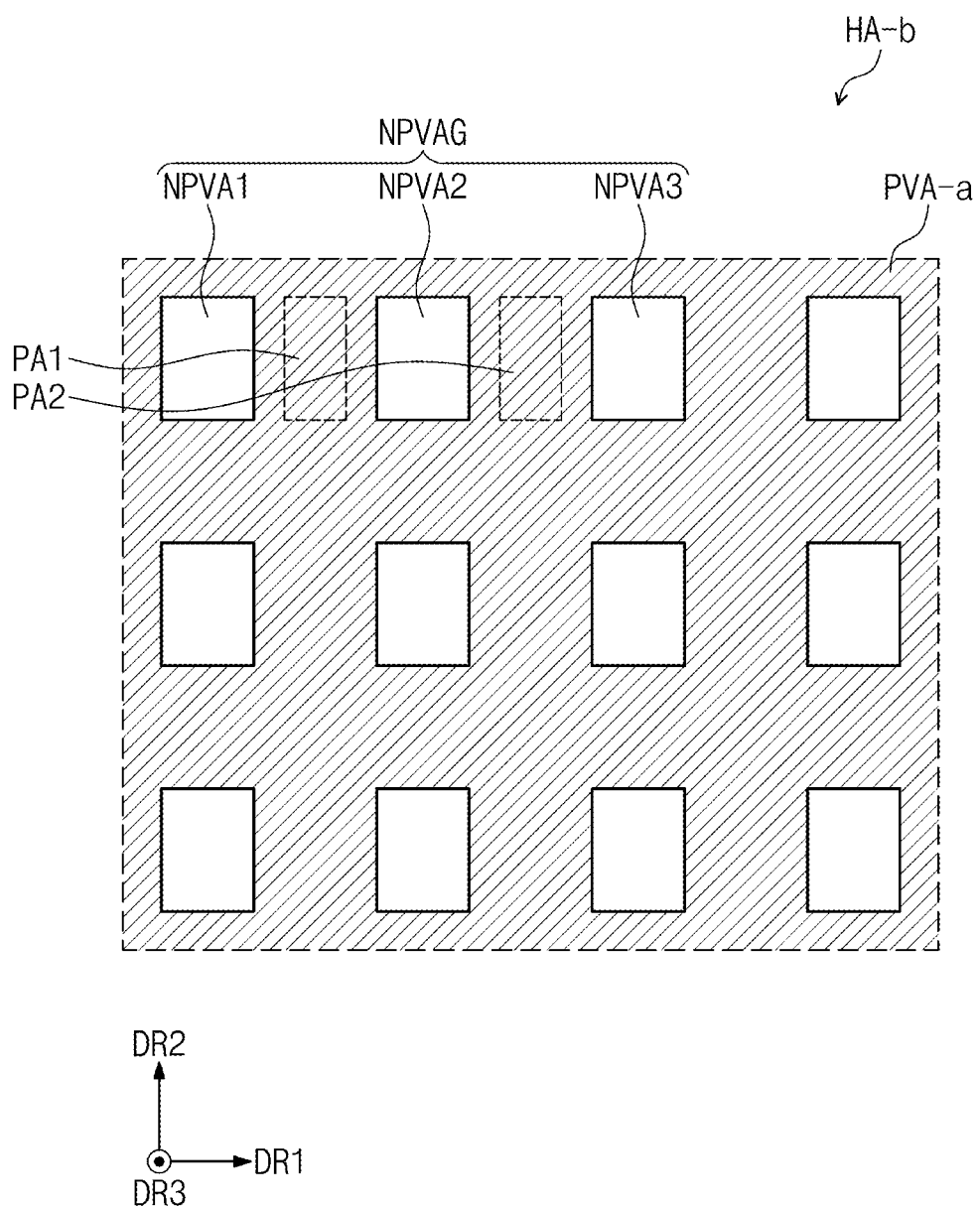
FIG. 11 is a plan view illustrating an exemplary embodiment of a polarizer layer constructed according to the principles of the invention.

The polarizer layer PVA may be patterned to include a plurality NPVAG of non-polarization portions NPVA1, NPVA2, and NPVA3 and a polarization portion PVA-a surrounding the non-polarization portions NPVA1, NPVA2, and NPVA3 as depicted in FIG. 11 through a laser scan method using a plurality of light sources or a mask method. However, the exemplary embodiments are not limited to the patterned shape shown in FIG. 11.

The display panel EP according to the exemplary embodiment of FIG. 8 may include a base layer BL, a pixel layer PXL, and an encapsulation layer TFE. These will be described in detail with reference to FIG. 10.

Figure 9:
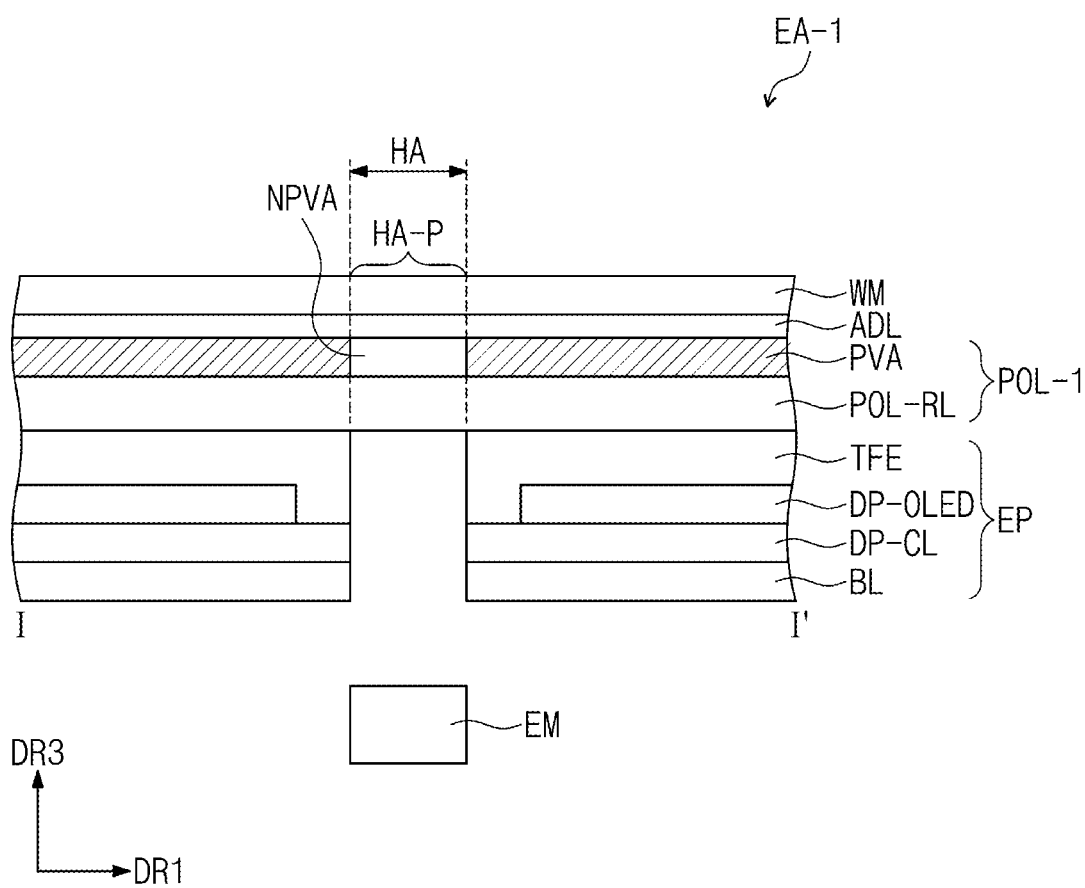
FIG. 9 is a cross-sectional view taken along line I-I' of FIG. 2 illustrating another exemplary embodiment of an electronic device constructed according to the principles of the invention.

FIG. 9 is a cross-sectional view taken along line I-I' of FIG. 2 illustrating another exemplary embodiment of an electronic device constructed according to the principles of the invention. FIG. 10 is a cross-sectional view taken along line I-I' of FIG. 2 illustrating a further exemplary embodiment of an electronic device constructed according to the principles of the invention. Hereinafter, different features of the electronic devices EA-1 and EA-2 from those of FIGS. 1 to 8 will be mainly described with reference to FIGS. 9 and 10.

Referring to FIGS. 9 and 10, polarizing plates POL-1 and POL-2 may include a retarder member POL-RL and a polarizer layer PVA. The retarder member POL-RL may include retarders RL1 and RL2 as shown in FIG. 4. The polarizer layer PVA may include a film member that is elongated and a light-absorbing material adsorbed onto the film member. For example, the polarizer layer PVA may include a dichroic dye or iodine adsorbed onto the elongate film member.

The polarizer layer PVA may include a transmission area HA-P. The transmission area HA-P may include a non-polarization portion NPVA. The non-polarization portion NPVA may have a light transmittance that increases by detaching and extracting the light-absorbing material adsorbed onto the polarizer layer PVA. The light transmittance of the non-polarization portion NPVA may be about 80% or more in the wavelength range of a visible ray.

The non-polarization portion NPVA may overlap a hole area HA defined through a display panel EP and an electronic module EM. The electronic module EM may be a camera module. The electronic module EM may receive an external input or may provide an output to the outside through the non-polarization portion NPVA included in the transmission area HA-P.

A base layer BL included in the display panel EP may be a transparent substrate. For example, the base layer BL may be a plastic substrate or a glass substrate. The electronic device EA-1 according to some exemplary embodiments may include a window WM and an adhesive layer ADL, which are disposed on the polarizing plate POL-1. The adhesive layer ADL may be disposed between the window WM and the polarizing plate POL-1. The adhesive layer ADL may adhere the window WM and the polarizing plate POL-1.

Referring to FIGS. 9 and 10, the non-polarization portion NPVA may be formed by detaching and extracting the light-absorbing material from the polarizing plates POL-1 and POL-2, and thus, the light transmittance of an area of the polarizing plates POL-1 and POL-2 may increase. Since the polarization is eliminated without a physical perforation, it is possible to prevent the phenomenon that the display panel in the area where the polarizing plate is physically removed is pressed by the adhesive layer.

A display panel EP shown in FIG. 10 may include a base layer BL, a pixel layer PXL disposed on the base layer BL, and an encapsulation layer TFE disposed on the base layer BL to cover the pixel layer PXL. The encapsulation layer TFE may include at least one inorganic layer. In addition, the encapsulation layer TFE may include an organic layer disposed between inorganic layers. The inorganic layer may protect the pixel layer PXL from moisture or oxygen. The organic layer may protect the pixel layer PXL from a foreign substance.

A light emitting element OLED may include a first electrode EL1, a second electrode EL2 facing the first electrode EL1, and an organic layer OEL disposed between the first electrode EL1 and the second electrode EL2. The organic layer OEL may include a hole transport area, a light emitting layer, and an electron transport area.

The pixel layer PXL may include a transistor to drive the light emitting element OLED, an insulating layer, and a connection electrode and the first electrode EL1 of the light emitting element OLED may be connected to the connection electrode through a contact hole CNT.

A pixel definition layer PDL may be disposed between the light emitting element OLED and an adjacent light emitting element. The pixel definition layer PDL may include a material that absorbs a light. The pixel definition layer PDL may overlap a non-light-emitting area NPA. The pixel definition layer PDL may be provided with a pixel opening OP defined therethrough. A portion of the first electrode EL1 may be exposed through the pixel opening OP of the pixel definition layer PDL.

Referring to FIG. 10, the pixel layer PXL of the display panel EP may include a plurality of light emitting areas PA and a non-light-emitting area NPA surrounding the plurality of light emitting areas PA. An electronic module EM may overlap the light emitting areas PA and the non-light-emitting area NPA. The electronic module EM may overlap a portion of the light emitting areas PA and a portion of the non-light-emitting area NPA. And the electronic module EM may overlap a transmission area HA-P included in a polarizer layer PVA. The transmission area HA-P may include a plurality of non-polarization portions NPVA overlapping with a portion of the non-light-emitting area NPA.

According to some exemplary embodiments, the display panel EP may include the light emitting areas PA that overlap the transmission area HA-P of the polarizer layer PVA. The image IM (as depicted in FIG. 1) may be provided to a user through the light emitting areas PA included in the display panel EP overlapping the electronic module EM and the transmission area HA-P. By maintaining the polarization of the polarizer layer PVA in a portion of the transmission area HA-P overlapping the light emitting areas PA, the reflection of the external light reduced, and visibility of an image provided through the transmission area HA-P may be improved.

According to some exemplary embodiments, since the electronic module EM is disposed under the display panel EP, increasing the light transmittance of the polarizer layer PVA that overlaps the electronic module EM is beneficial. The non-polarization portion NPVA may correspond to a portion from which a light-absorbing material included in the polarizer layer PVA, e.g., dichroic dye or iodine, is detached. The light transmittance of the transmission area HA-P may increase by the non-polarization portions NPVA.

The electronic module EM disposed under the display panel EP may be operated while eliminating the polarization of the polarizer layer PVA overlapping the non-light-emitting area NPA on the electronic module EM and maintaining the polarization of the polarizer layer PVA overlapping the light emitting area PA, and substantially simultaneously, the image IM may be displayed through a first area HA in which the display panel EP overlaps the electronic module EM. Accordingly, the user may view the image IM through the wider display area TA.

FIG. 11 is a plan view illustrating an exemplary embodiment of a polarizer layer constructed according to the principles of the invention. Referring to FIG. 11, the non-polarization portions NPVA1, NPVA2, and NPVA3 may be patterned in a substantially constant shape or at substantially regular intervals. The non-polarization portions NPVA1, NPVA2, and NPVA3 may be surrounded by the polarization portion PVA-a. However, the shape of the non-polarization portions NPVA1, NPVA2, and NPVA3 should not be limited to the shape shown in FIG. 11. The patterning process may be performed through the laser scan or mask method.

The non-polarization portions NPVA1, NPVA2, and NPVA3 may be formed by detaching and extracting the light-absorbing material adsorbed onto the polarizer layer PVA without physically removing the polarizer layer PVA. That is, the polarization of an area of the polarizer layer PVA may be eliminated, and thus, the light transmittance may increase. The polarization portion PVA-a may overlap a plurality of light emitting areas PA1 and PA2 defined thereunder to reduce the reflection of the external light.

Figure 12:
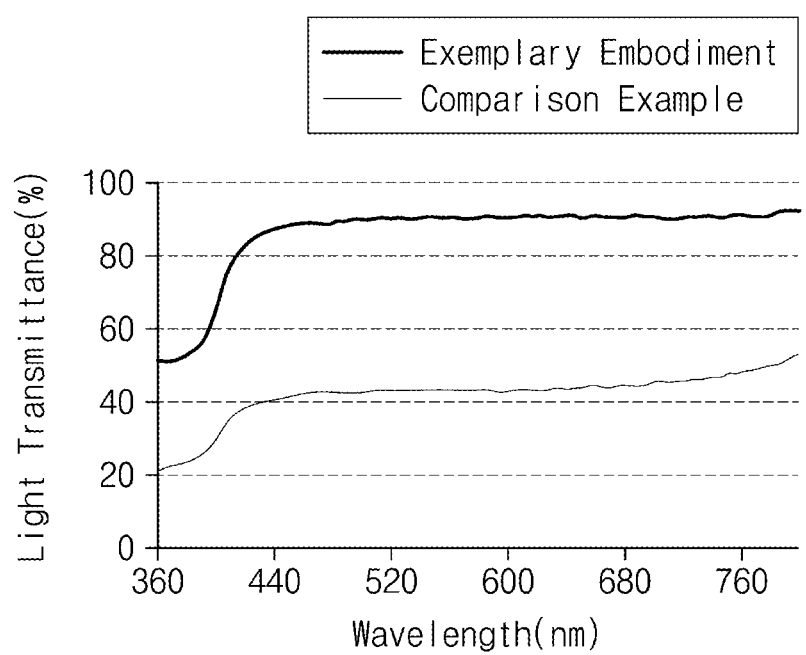
FIG. 12 is a graphical depiction illustrating light transmittance as a function of wavelength according to an exemplary embodiment of the invention.

FIG. 12 is a graphical depiction illustrating light transmittance as a function of wavelength according to an exemplary embodiment of the invention. An exemplary embodiment of the invention shows the light transmittance of the transmission area provided with the neutral solution at a room temperature after irradiating a nanosecond pulse laser beam having a wavelength value of about 532 nm to the polarizer layer PVA with an output of about 1.5 W. A comparison example shows the light transmittance of the polarization area that maintains the polarization without being irradiated with the laser beam.

Referring to FIG. 12, in the visible light wavelength range, the light transmittance of the polarization area of the comparison example is maintained at a value of about 45% or less. In the visible light wavelength range, the light transmittance of the transmission area of the exemplary embodiment is significantly and maintained at a value of about 80% or more, and there is also an area in which the light transmittance of the transmission area is maintained at a value of about 90% or more.

In addition, in the polarizing plate POL according to the exemplary embodiment, when the residual dichroic dye or iodine is extracted by the neutral solution NS and the polarizing plate POL is subjected to the unbiased highly accelerated temperature and humidity stress test (Uhast) using high temperature and high humidity as environmental parameters, the color of the polarizing plate POL is not changed and the increased light transmittance is maintained. As an example, the color change by the residual iodine was not observed even after about 500 hours in an environment at a temperature of about 65° C. and a relative humidity of about 90%.

That is, in the case of the exemplary embodiment provided with the neutral solution at a room temperature after being irradiated with the nanosecond pulse laser beam having the wavelength value of about 532 nm at the output of about 1.5 W, it was observed that the polarization characteristics are effectively removed through results that significantly and show the light transmittance equal to or higher than about 80%. In addition, it was observed that the polarization characteristics are effectively controlled in the polarizer layer by the method of the exemplary embodiment through results that show the good reliability characteristics in the high temperature and high humidity test conditions.

Manufacturing methods in accordance with the principles and some exemplary implementations of the invention and/or exemplary methods of the invention include detaching the adsorbed light-absorbing material by irradiating the polarizer layer with a laser beam and extracting the light-absorbing material by providing a neutral solution to the polarizer layer. Accordingly, the color change problem caused by the reversible reaction of the residual light-absorbing material is solved, and the light transmittance is improved. In addition, the light transmittance of an area of the polarizer layer may increase without physical perforation of the polarizer layer.

Electronic devices constructed according to principles and some exemplary embodiments of the invention increase the light transmittance of the area of the polarizing plate, which overlaps the electronic module disposed under the display panel. Thus, the electronic module disposed under the display panel may receive the input from the outside or may provide the output to the outside. As another example, it is possible to provide the image even in the area where the display panel overlaps the electronic module, and thus, the electronic device may have the wider display area.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device comprising:
an electronic module;
a display panel comprising a first area overlapping the electronic module and a second area at least partially surrounding at least a portion of the first area; and
a polarizer disposed on the display panel,
wherein the first area comprises:
a plurality of light emitting areas; and
a plurality of non-light-emitting area not overlapping the light emitting areas,
wherein the polarizer comprises:
a polarizer layer, wherein the polarizer layer has a polarization area and a transmission area overlapping the first area with at least a portion of the transmission area comprising a plurality of non-polarization portions;
a protection layer disposed under the polarizer layer; and
a plurality of retarders disposed under the protection layer that retard a phase of light incident thereon,
wherein the polarizer layer comprises an elongated film member and a light-absorbing material adsorbed to the elongated film member,
wherein each of the non-polarization portions includes the elongated film member where the light-absorbing material is detached from the elongated film member, and
wherein each of the non-light-emitting areas overlaps with each of the non-polarization portions.

2. The electronic device of claim 1, wherein the non-polarization portion has a light transmittance substantially equal to or greater than about 80%.

3. The electronic device of claim 1, wherein the light-absorbing material comprises at least one of iodine and dichroic dye.

4. The electronic device of claim 1, wherein the electronic module comprises a camera module.

5. The electronic device of claim 1, further comprising:
a window disposed on the polarizer; and
an adhesive layer disposed between the polarizer and the window.

6. The electronic device of claim 1, wherein each of the non-polarization portions is formed by irradiating a laser beam onto a portion of the polarizer layer to detach the light-absorbing material on the polarizer layer, and providing a substantially neutral solution including water onto the portion of the polarizer layer irradiated with the laser beam to extract the light-absorbing material detached by the laser beam.

7. The electronic device of claim 1, wherein the transmission area overlaps the electronic module along a thickness direction of the electronic device.

8. The electronic device of claim 1,
wherein the non-polarization portions are first non-polarization portions,
wherein the transmission area further comprises a plurality of second non-polarization portions and a plurality of polarization portions between the first non-polarization portions and the second non-polarization portions, and wherein the first non-polarization portions, the polarization portions, and the second non-polarization portions overlap the electronic module.

9. The electronic device of claim 8, wherein the first non-polarization portions, the second non-polarization portions, and the polarization portions are formed by disposing a mask over the polarizer and irradiating a laser beam onto a portion of the polarizer layer including the first non-polarization portions, the second non-polarization portions, and the polarization portions to detach light-absorbing material on the polarizer layer, and providing a substantially neutral solution having onto the portion of the polarizer layer irradiated with the laser beam to extract the light-absorbing material detached by the laser beam.

\* \* \* \* \*